United States Patent [19]

Parke

[11] 4,035,589
[45] July 12, 1977

[54] ENTERTAINMENT AND PUBLIC ADDRESS SYSTEM WITH REPLAY OF ENTERTAINMENT PROGRAM AFTER A PUBLIC ADDRESS INTERRUPTION

[75] Inventor: Harry G. Parke, Brooklyn, N.Y.

[73] Assignee: Marine Electric Corporation, Brooklyn, N.Y.

[21] Appl. No.: 644,442

[22] Filed: Dec. 29, 1975

[51] Int. Cl.² .................................. G11B 15/20
[52] U.S. Cl. ................... 179/100.1 C; 179/1 VE; 179/100.1 PS; 360/12
[58] Field of Search ............ 179/100.1 R, 100.1 C, 179/100.1 PS, 1 SW, 1 AT, 1 VE; 360/12, 61

[56] References Cited
U.S. PATENT DOCUMENTS

| | | | |
|---|---|---|---|
| 2,495,749 | 1/1950 | Mayle | 179/1 VE |
| 3,632,893 | 1/1972 | Bolick | 179/100.1 R |
| 3,795,769 | 3/1974 | Nowka | 179/1 SW |

Primary Examiner—Raymond F. Cardillo, Jr.

Attorney, Agent, or Firm—Imirie, Smiley & Linn

[57] ABSTRACT

An entertainment and public address system especially suited for mass transit vehicles, including a tape recorder on which is recorded information such as music, news bulletins, announcements, and the like, connected through appropriate amplification circuits to speakers for playback within the listening range of the vehicle passengers. A separate public address circuit is provided for the vehicle operator or conductor and includes a switch which, when actuated, connects a microphone of the public address system through the amplification and speaker network and also energizes a time delay network to rewind the tape recorder a preselected amount regardless of the length of time the public address system is in use. Release of the switch returns the system to normal operation whereupon the rewound tape recorder plays back the last portion of the interrupted recording so as to: preserve continuity of the information being perceived by the passengers.

4 Claims, 1 Drawing Figure

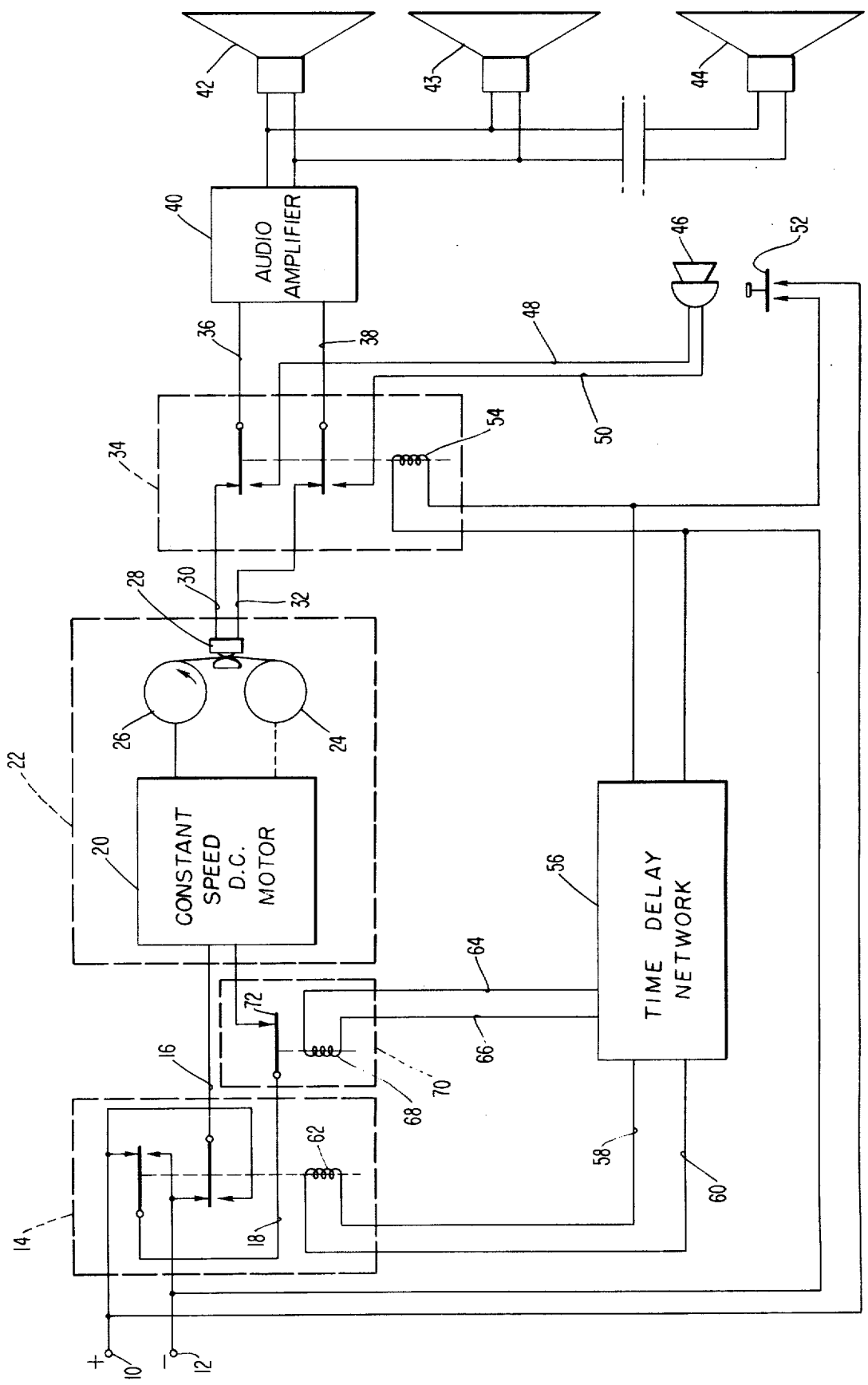

ENTERTAINMENT AND PUBLIC ADDRESS SYSTEM WITH REPLAY OF ENTERTAINMENT PROGRAM AFTER A PUBLIC ADDRESS INTERRUPTION

BACKGROUND OF THE INVENTION

1. Field of the Invention

The present invention relates to audio entertainment systems, and more particularly, to a composite entertainment and public address system exhibiting improved information transfer characteristics.

2. Description of the Prior Art

Many systems are presently available for providing background music and for enabling the selective interruption of music for the purpose of playing messages, announcements and the like. Such systems are found in hotels, hospitals and other fixed installation but have had only limited application on Mass Transit vehicles although modern Mass Transit vehicles are equipped with Public Address Systems, for the announcements of station stops and emergency instructions, that would be well adapted for the carrying of music, commercials, etc.

Two main problems have prevented Transit companies from realizing the benefits of the entertainment programs that could be carried. First, because of the high electrical noise levels generated by the electrical propulsion systems of modern transit cars and because such vehicles frequently travel in tunnels and between metallic structures, high quality radio reception is impossible. Secondly, since it is necessary that station and emergency announcements make frequent priority interruptions on the program, present techniques do not permit the uninterrupted transmission of information; that is, a commerical or news announcement could be lost by a necessary station announcement and cause dissatisfaction to both riders and advertisers. My invention deals with and provides satisfactory solution to both problems.

SUMMARY OF THE INVENTION

It is, therefore, an object of the present invention to provide a means whereby high quality audio entertainment may be heard on moving transit vehicles despite the impracticality of high quality radio reception.

It is a further object of the present invention to provide a composite entertainment and public address system wherein actuation of the public address network automatically conditions the equipment for the repeat of a terminal portion of the previously broadcast information following the end of the public address announcement.

The present invention has a further object in the selective broadcast of audio information from either of two input sources without interference and with minimal loss of information.

Another object of this invention is to enable frequent priority interruptions in pre-recorded entertainment, announcement and commercial programs played through a vehicle public address system while preserving the information content of the interrupted message.

This invention exhibits a number of material advantages over the prior art in that recorded entertainment material may be broadcast over a public address network without degrading the public address function of the system that use of the public address system automatically recycles the entertainment section to repeat the last portion of the entertainment material, that commericals and news programs may be broadcast over a public address system without fear of loss of information in the event of a random interruption for a public address announcement, and that the system may be readily incorporated into existing public address systems with minimal costs.

Other objects and advantages of the present invention will become apparent from the following description of the preferred embodiment when taken in conjunction with the accompanying drawing.

BRIEF DESCRIPTION OF THE DRAWING

The FIGURE is a schematic diagram of a preferred embodiment of the entertainment and public address system according to the present invention.

DESCRIPTION OF THE PREFERRED EMBODIMENT

Referring to the FIGURE, the system is designed to operate from a source of direction current operating potential represented by positive and negative terminals 10 and 12, respectively. Terminals 10 and 12 are connected to a double pole, double throw relay control switch 14 which is wired so as to function as a polarity reverser. The output of switch 14 is fed over lines 16 and 18 to a constant speed DC motor 20.

Motor 20 is preferably part of a tape recorder 22 which includes, in addition to the motor, a source reel 24 containing a length of magnetic tape on which is recorded entertainment, commerical and/or news messages, a takeup reel 26, and a pickup head 28. The DC motor 20 is interconnected to supply reel 24 and takeup reel 26 by suitable gearing and clutch assemblies such that the motor, when running in the forward direction, drives the takeup reel 26 in the direction shown by the arrow, and when running in the reverse direction, causes the supply reel 24 to rewind the tape. An idler wheel (not shown) may also be provided for cooperation with the constant speed DC motor 20 and the head 28 so as to accurately regulate the speed of travel of the tape past the head in the forward direction. In such case, reversible slip clutches may be used between the constant speed DC motor 20 and each of the reels 24 and 26 so that the reels will wind up the tape without disturbing the speed of tape advance as controlled by the idler wheel. It will be appreciated that the various clutches, gears and interconnecting mechanisms between the motor, the reels 24 and 26 and head 28 are well known to those of ordinary skill in the art and therefore are not described in detail for the sake of brevity.

The output from head 28 is fed over lines 30 and 32 to one set of fixed input contacts of a two section relay controlled switch 34. The output of switch 34 is taken from the two movable contacts thereof and is fed over lines 36 and 38 to the input terminals of an audio amplifier 40. The output of audio amplifier 40 is in turn connected over suitable leads to any number of speakers, shown diagrammatically as speakers 42 – 44, which may be placed in any number of appropriate locations.

The second set of fixed input contacts of two section switch 34 is connected to the output of a microphone 46 via leads 48 and 50. A normally open push button switch 52 is associated with the microphone 46 and may be incorporated into the same housing, if so desired. Switch 52 is connected in series with the actuating coil 54 of relay 34 across the positive and negative input terminals 10 and 12, respectively. In addition, the input terminals of a time delay network 56 are connected in parallel with the coil 54 so that whenever switch 52 is actuated and operating potential is supplied to coil 54, a voltage input will be provided to the time delay network 56.

Time delay network 56 has a first set of outputs connected by line 58 and 60 across the actuating coil 62 of the polarity reversing relay 14. The second set of outputs of time delay network 56 are similarily connected by lines 64 and 66 across the actuating coil 68 of a relay 70 having a normally closed set of contacts 72 serially interposed in line 18 between the polarity reversing relay 14 and the constant speed DC motor 20. The first set of outputs provides a signal immediately upon application of an input to the time delay network while the second set of outputs provides a signal a preselected time thereafter. As such, the first set of outputs may be connected directly to the input terminals of the time delay network, and the second set may be connected thereto by a solid state timing or counting network of any suitable type. Such timing or counting networks are well known commercially available circuits, the details of which are not further described for the sake of brevity.

The present invention may be used for any number of diverse applications, but is especially well suited for use in connection with mass subway system and inter-urban rail lines. When used in connection with a subway system, for example, the speakers represented by speakers 42 - 44 will be spaced throughout each of the individual subway cars so that the information being broadcast can be conveniently heard by all of the passengers. Microphone 46 and switch 52 are preferably provided at the motorman's or conductor's station, and tape recorder 22 is disposed in an accessible portion of the train so that the prerecorded tapes may be replaced, as necessary. It should be understood, of course, that tape recorder 22 may be appropriately modified so as to accept tape cassettes rather than open reel tapes to facilitate rapid interchange of prerecorded material.

In operation, operating potential will normally be supplied through relay 14 and the normally closed switch 72 to the input of constant speed DC motor 20 so as to cause the same to run in the forward direction. At this time, relay 34 supplies the output signals from the tape head 28 to the input of audio amplifier 40 for subsequent playback over speakers 42 - 44. In this manner, entertainment, news, and commercial programs may be provided for the enjoyment of the vehicle passengers.

When it is necessary for the motorman or conductor to make an announcement over the public address system, push buttom switch 52 is actuated to energize coil 54 whereupon relay 34 disconnects the input of audio amplifier 40 from the output of head 28 and, at the same time, connects the audio amplifier input to lines 48 and 50 from microphone 46. Audio amplifier 40 will then amplify the signals from the microphone for broadcast throughout the train. At this point, it is noted that a second tape recorded may be provided in addition to or in lieu of the microphone 46. The additional tape recorder may contain a cassette on which is prerecorded a sequential series of station announcements corresponding to the stations at which the train will be stopping. The output of this recorder may be connected in parallel to the output of microphone 46, with operation of the recorder controlled by push button 52 for concurrent operation. In this manner, just prior to arriving at each station, the motorman can merely actuate push button 52 thereby transferring the audio amplifier input from the tape recorder 22 to the auxiliary tape recorder for playing out the next sequential message announcing the upcoming stop.

When push button switch 52 is actuated, not only is relay 34 energized so as to transfer the input feeding audio amplifier 40, but the time delay network 56 is also energized. As soon as the time delay network 56 receives an input signal, it supplies operating potential over lines 58 and 60 to coil 62 of the polarity reversing relay 14. This results in the reversal of polarity of the signals applied over lines 16 and 18 to the constant speed DC motor 20. The tape is caused thereby to rewind from takeup spool 26 back onto supply reel 24.

After a predetermined time interval, such as 5 seconds, an energizing signal will be provided by time delay network 56 over lines 64 and 66 to relay coil 68. As a result, coil 68 will cause relay contacts 72 to become opened whereupon the input supply to motor 20 is interrupted. In this manner, as soon as the motorman actuates push botton 52, the tape recorder 22 begins to rewind. After the desired preselected time interval has elapsed, further rewinding of the tape recorder will be interrupted and the recorder will remain in a quiescent or stand-by state until the push button 52 is released.

Upon release of push button 52, time delay network 56 will be removed from the circuit and relays 70 and 14 will revert to their normal positions. Likewise, relay 34 will return to normal so that the prerecorded information from the tape recorder 22 will again be broadcast from the speakers 42 - 44. Since actuation of the push button switch 52 immediately and automatically causes the tape recorder to be partially rewound, the terminal portion of the recorded information on the tape will again be broadcast so that the vehicle passenger will be able to fully understand the recorded information despite the interruption.

In view of the foregoing, it can be appreciated that the present invention provides a simple and expedient technique for the provision of entertainment, news, and commercial messages with minimal, if any, loss of information despite repeated, random interruptions for public address messages of one sort or another. The system is extremely simple and can be readily incorporated into existing public address networks at modest cost.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. An entertainment and public address system comprising:
    an amplifier;
    at least one speaker connected to an output of said amplifier;
    first and second sources of audio input signals, said first source including a recorder having a reversible drive adapted to be connected to a source of operating potential;
    switching means having first and second positions for alternately coupling said first and second audio input sources, respectively, to said amplifier; and rewind means connected to said switch means and said recorder for rewinding said recorder a preselected amount in response to actuation of said switching means to said second position, said rewind means including:
  interrupt means connected to said drive for selectively interrupting the supply of operating potential to said drive; and
  a time delay network connected to said interrupt means and said drive for reversing said drive in response to actuation of said switching means to said second position and for actuating said interrupt means to preselected time after actuation of said switching means to said second position whereby said recorder is rewound by said preselected amount whenever said second audio input source is connected to said amplifier.

2. The system as recited in claim 1 wherein said reversible drive includes a direct current motor coupled with a polarity reversing switch network.

3. The system as recited in claim 1 wherein said second source of audio signals comprises a microphone.

4. The system as recited in claim 1 wherein said switching means comprises a double-pole, double-throw relay.

* * * * *